June 11, 1935.  M. L. FOX ET AL  2,004,752
HYDRAULIC SHOCK ABSORBER
Filed June 16, 1932  3 Sheets-Sheet 2
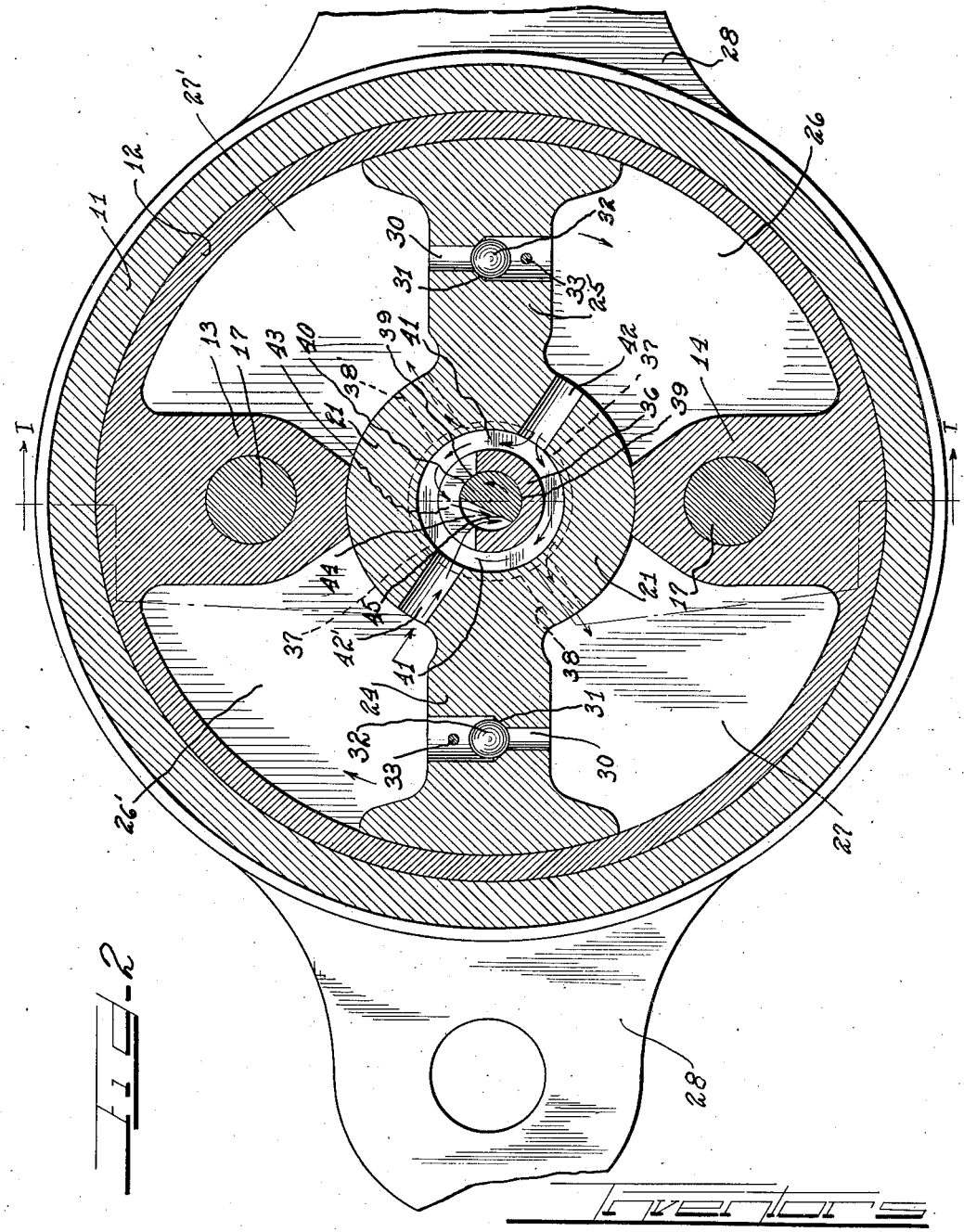
Inventors
Merritt L. Fox.
and Fred E. Ullery.
by Charles Miller Attys.

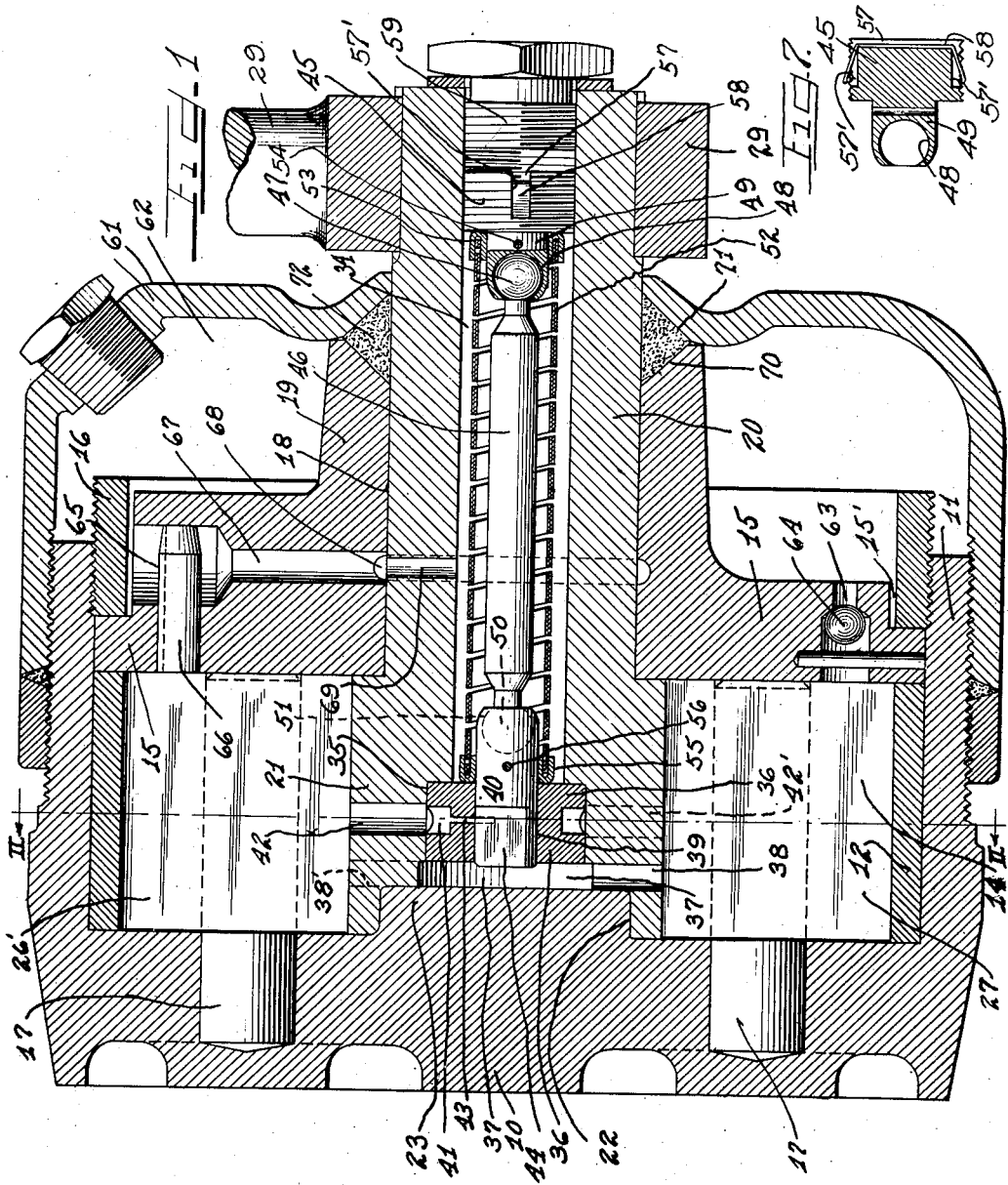

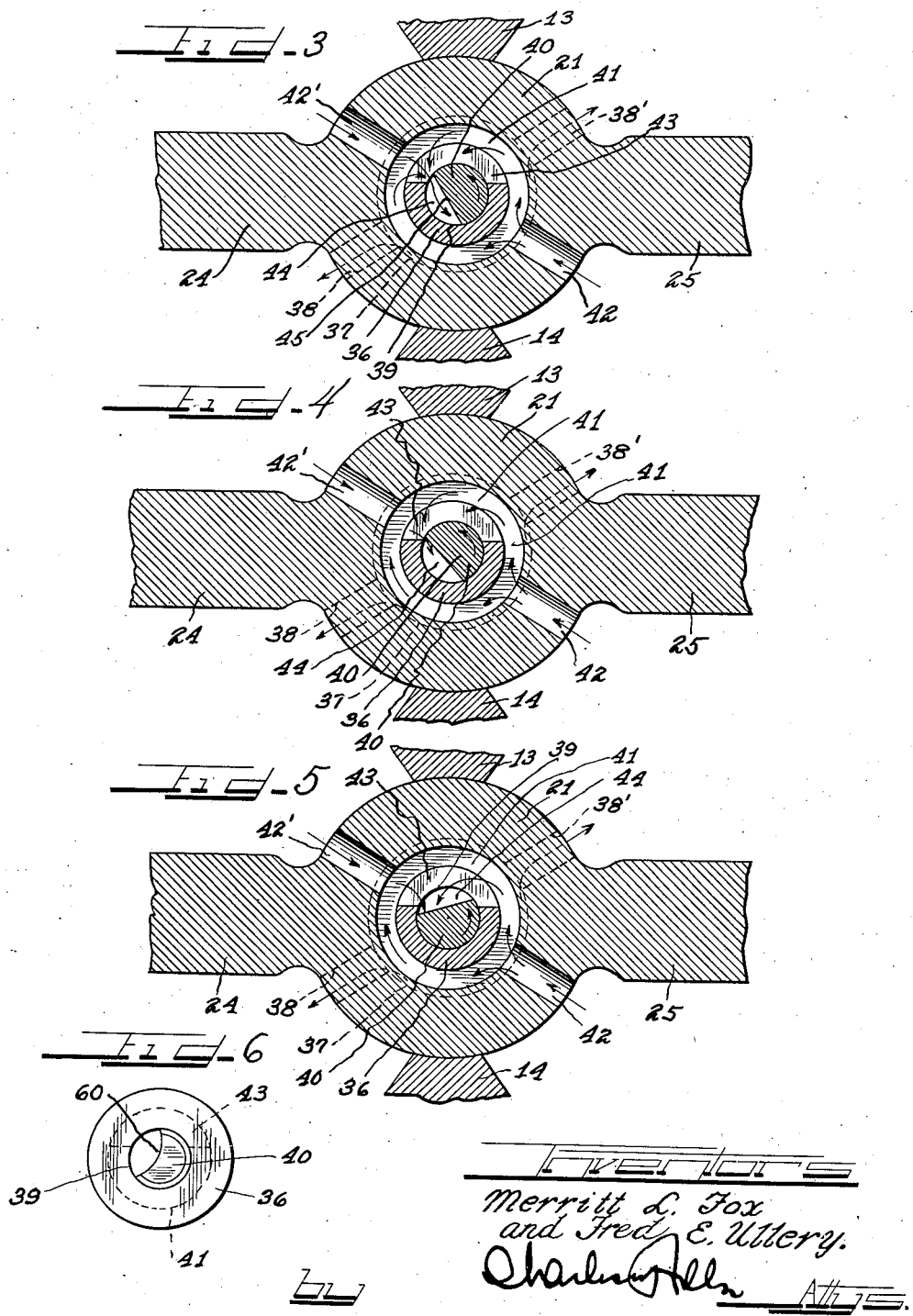

Patented June 11, 1935

2,004,752

UNITED STATES PATENT OFFICE 2,004,752

HYDRAULIC SHOCK ABSORBER

Merritt L. Fox, Buffalo, N. Y., and Fred E. Ullery, South Bend, Ind.; said Fox assignor to Houde Engineering Corporation, Buffalo, N. Y., a corporation of New York Application June 16, 1932, Serial No. 617,614

31 Claims. (Cl. 188—89)

This invention relates to hydraulic shock absorbers and concerns particularly improved valve construction and arrangement for controlling the bypassage of resistance fluid from one side of the piston to the other.

The invention concerns particularly valve structure in which a rotary valve is interposed in the fluid bypass and an important object is to provide an improved orifice arrangement for directing the fluid for impact engagement with a vane surface on the rotary valve and disposed relative to such vane surface that the valve will be rotated toward bypass closing position by the force of the fluid impact.

A further object is to provide improved arrangement for thermostat means for rotating said valve for setting thereof to automatically compensate for change in temperature of the resistance fluid.

A further object is to provide supporting arrangement for the rotary valve for holding it in proper alignment in its seat but permitting it to be freely adjusted for temperature correction and to freely and accurately respond to the fluid impact, the thermostat element functioning as a spring to resist the impact rotation of the valve.

Another object is to provide an arrangement in which a valve stem has universal coupling connection with the valve and with an adjusting head and in which the thermostat element is in the form of a helix secured to the valve and to the head and embracing the stem.

The above enumerated and other features of the invention are incorporated in the structure disclosed on the drawings, in which drawings Figure 1 is a diametral section of a hydraulic shock absorber of the Houdaille type taken on plane I—I of Figure 2 showing the position of the valve under normal temperature and normal road conditions;

Figure 2 is a section taken on plane II—II of Figure 1;

Figure 3 is a section of part of the hub and piston element and illustrating the operation of the valve under increased fluid velocity conditions;

Figure 4 is a section similar to Figure 3 but showing the position of the valve for high temperature;

Figure 5 is a section similar to Figure 3 but showing the valve in position for extreme low temperature;

Figure 6 is an end view of the valve seat member and the valve therein but showing a modified form of valve;

Figure 7 is a diametral section of the valve adjusting head showing the application of a friction spring for holding the head in adjusted position.

The body of the shock absorber structure shown comprises the rear or base wall 10 having the peripheral cylindrical wall or flange 11 extending laterally therefrom to define a cylindrical space. Within the wall 11 and abutting thereagainst and against the base wall 10 is the ring 12 from which extend the diametrically opposite partition walls 13 and 14. The outer cylindrical wall or head 15 fits into the cylindrical wall 11 and abuts against the ring 12 and the partition walls 13 and 14 and has the annular recess 15' at its outer end for receiving the clamping ring 16 which has threaded engagement with the interior thread at the outer end of the wall 11, the head 15 thus being securely clamped in position. To securely hold the ring 12 and partitions 13 and 14 in place, we have shown pins or keys 17 extending through the partitions and into the base wall 10.

The head 15 has the bearing bore 18 which is continued through the lug or sleeve 19 extending outwardly from the head, and this bore journals the shaft 20 having at its inner end the cylindrical hub 21 which extends axially between the head 15 and the base wall 10 and has the cylindrical bearing pocket 22 for receiving the centering end bearing lug 23 extending from the base wall 10. Extending radially from opposite sides of the shaft hub are the piston members 24 and 25 whose outer ends fit against the ring 12 between the partition walls 13 and 14, the piston members extending axially between the head 15 and the base wall 10. The opposed ends of the partition walls are of cylindric surface to engage against the shaft hub with bearing fit, the piston members, the partition walls and the ring 12 dividing the interior of the shock absorber into the high pressure working chambers 26 and 26' and the low pressure chambers 27 and 27'.

The base wall 10 has ears 28 extending therefrom by means of which the shock absorber body may be secured to a support, as, for example, the chassis of an automotive vehicle; and the shaft at its outer end has secured thereto an arm 29 whose end is adapted for connection, as, for example, with the axle of the automotive vehicle, so that as the vehicle travels and the vehicle body and axles move relatively, the shaft will oscillate the piston members against the resistance of a fluid such as oil in the working chambers.

Each of the piston members 24, 25 has a relief passageway 30 therethrough in which is a valve seat 31 for a ball valve 32, the balls being held against escape from the passageways as by means of cross pins 33. The valve seats face the high pressure chambers 26 and 26' so that when the piston hub 21 is rotated in clockwise direction (Figure 2) the relief passageways will be closed, but when the hub rotates in the opposite direction the passageways will be opened, the resistance to rotation of the hub being thus greater in one direction than the other and usually so that the hub and pistons may rotate more freely when the vehicle chassis and axle approach each other.

The valve-controlled relief or by-passage way for fluid from one side of the piston members to the other during separation or rebound movement of the vehicle chassis relative to the axle, will now be explained. Extending through the shaft 20 is the axial cylindrical bore or chamber 34 whose inner end within the hub 21 is enlarged to form a cylindrical pocket or space 35 in which is secured a valve seat plug or block 36, leaving the space 37 between the block and guide lug 23 on the base wall. This space 37 is connected by the port or passageway 38 with the low pressure chamber 27 and by the port or passageway 38' with the low pressure chamber 27', the low pressure chambers being thus always in communication through this space and the passageways, which passageways are suitably restricted.

The valve seat plug 36 has the cylindrical axial passageway 39 forming a seat for the cylindrical valve member 40 whose inner end projects into the chamber 34 in the shaft 20. The valve seat plug has also the circumferentially extending channel 41 and communicating with which are the passageways 42 and 42' which extend through the hub 21 and lead to the high pressure chambers 26 and 26' adjacent to the piston members 25 and 24, respectively, the high pressure chambers being thus at all times in communication with each other.

Extending through the valve seat member 36 from the bottom of the channel 41 to the bore 39 thereof is a port 43 preferably in the form of a narrow slit which may be formed by milling across the seat member so that the slit will be of arcuate extent as clearly shown in Figure 2, the arcuate extent being preferably less than 180 degrees. The valve member 40, at its outer end, is provided with a port or passageway 44 which may also be formed by milling across the valve member a distance outwardly from the axis thereof and to leave a vane surface 45 which, as shown in Figures 1 to 5, is flat. The inner end of the valve member 40 within the seat member 36 remains cylindrical so as to form a seal against the escape of fluid. The position of this valve port or passageway 44 relative to the slit or orifice 43 determines the area of the passageway through which the fluid may flow. When the piston structure is rotated in anti-clockwise direction (Fig. 2) the fluid can flow from the low pressure chambers to the high pressure chambers past the valves 32 and also through the hub of the piston under control of the valve member 40, the flow through the hub being by way of the passageways 38, 38', the space 37, the valve port 44, the orifice 43, the channel 41 in the valve seat member and the passageways 42 and 42'. When the piston structure rotates in clockwise direction in the shock absorber body the valves 32 will be closed and then the fluid can escape from the high pressure chambers 26 and 26' to the low pressure chambers only by way of the restricted passage afforded by the valve member 40.

At its outer end the bore 34 of the shaft 20 has interior threading for receiving the threaded abutment head 45 between which and the valve member 40 extends the valve stem 46. The stem has universal joint connections at its ends with the head 45 and the valve member. At its outer end the stem has the ball 47 engaging in the spherical socket 48 formed in the neck 49 extending inwardly from the head 45, and at its inner end the stem has the ball 50 engaging in the spherical socket 51 formed in the inner end of the valve member 40. This universal connection between the valve stem and the valve member and head leaves the valve member free to rotate accurately in the bore of the seat member 36, while at the same time it will be held against axial displacement, and even though the threading in the bore of the shaft may be out of alignment, the proper and easy functioning of the valve member will not be interfered with.

Within the shaft bore 34 and concentric with the valve stem is the thermostat element 52 which may be in the form of a helix of two bands of metal welded together and having different rates of expansion under temperature change. At its outer end the helix is clamped between folds of a ferrule 53 which seats on the neck 49 of the head 45 and is secured thereto as by means of a pin 54. At its inner end a similar ferrule 55 receives the helix and is secured to the valve member 40 as by means of a pin 56.

By means of a screw driver slot 57 in the end of the threaded head 45 it may be readily turned in the threaded end of the bore 34 for setting of the valve member 40 and as best shown in Figures 1 and 7 the head 45 may have side channels 57' communicating with the screw driver slot for receiving the ends of the U-shaped friction spring 58 which bears against the threads of the bore 34 and locks the head 45 in adjusted position. After adjustment of the valve the outer end of the shaft bore may be closed against access by a closure plug 59. By rotation of the head 45 the valve member 40 may be given the desired adjustment axially in the valve seat member 36 through the stem connection 46, and the thermostat helix will communicate the rotation of the head for rotational setting of the valve member.

Manual setting of the valve is made for normal temperature and with the valve member in position relative to the orifice 43 for normal road conditions or so-called boulevard riding. Adjustment is preferably made when the shock absorber structure and the thermostat member are at a predetermined normal temperature and after such adjustment the position of the valve port may be that indicated in Figures 1 and 2, the valve being about half way open. As the vehicle travels over ordinary roads and the temperature at the thermostat element does not change, the valve will remain in this position. Should the temperature increase on account of the heating of the fluid by its flow resistance, or for any other reason such as change in weather, the thermostat element will respond and will cause rotation of the valve member toward closing position as illustrated in Figure 3, the rotation of the valve with increasing temperature being in counterclockwise direction. The result is that the flow through the valve controlled passageway is restricted in accordance with the decreasing viscosity of the fluid with temperature change so that the shock absorbing resistance of the shock absorber remains constant. Figure 4 illustrates the closing movement of the valve under very high temperature of the fluid. Figure 5 illustrates the rotation of the valve member in reverse direction should the temperature be very much reduced, the valve opening up in accordance with the increasing viscosity of the fluid so that the shock absorbing resistance of the shock absorber may be maintained.

Ordinarily the travel of vehicles such as automobiles is in greater part over the ordinary roadways of more or less boulevard smoothness and therefore the manual setting of the valve of the shock absorber is usually for efficient operation of the shock absorber under such conditions. Such setting, however, is not always best for efficient operation of the shock absorber for easy travel of the vehicle over rougher roads and at high speed, and the rebound action of the vehicle may be too great for comfortable riding. It is therefore desirable that under such severe driving conditions greater resistance be interposed to the bypassage of the fluid in the shock absorber so that the shock absorber may more efficiently oppose the rebound force and absorb the energy thereof. The increased opposition to fluid flow in the shock absorber should be built up in proportion to the increasing rebound energy and fluid velocity in order that the shock absorber resistance may be proportionate to the severity of the road conditions and build up steadily from boulevard ride to high speed ride over the rough roads. With the valve arrangement shown and described, the fluid flowing through the valve passageway and being obstructed by the valve, will exert sufficient pressure against the valve to rotate it toward its closing position so as to increase the bypassage flow resistance in accordance with the increasing velocity or impact pressure of the fluid so that the shock absorber will thus entirely automatically adjust itself to meet the various road conditions.

Figures 1 and 2 show the setting for the valve structure which may be made for the normal service conditions or so-called boulevard riding, the adjustment being made when the shock absorber structure is at a predetermined normal temperature, the climate in which the shock absorber is to be used being usually an important factor in determining the temperature at which adjustment is made. As shown, the valve member has been set to be approximately half way open, about one half of the orifice slit 43 being open to the valve passageway or port 44. During a bump movement of the shock absorber, the piston structure will rotate in anti-clockwise direction (Figure 2) and a considerable part of the fluid passes from the low pressure chambers to the high pressure chambers through the open valves 32, the rest of the fluid traveling through the passageway controlled by the valve member 40. During rebound operation of the shock absorber, the piston structure rotates in clockwise direction and the valves 32 will be closed and all the fluid must travel through the by-passageway controlled by the valve member 40.

The thermostat element 53 extending between the anchored head 45 and the valve member 40 performs two functions. In the first place, it rotatably adjusts the valve automatically in accordance with temperature changes, and in the second place, it functions as a spring to resist rotation of the valve member by fluid impact against the vane surface 45 of the valve. Such spring action will be independent of the thermal action, the thermal action automatically setting the valve in accordance with temperature change and the spring action then tending to hold the valve against displacement from such setting.

While the vehicle is traveling over ordinary roadway and the by-passage flow of fluid is restricted to the valve-controlled passageway during rebound operation of the shock absorber, the impact energy of the liquid against the valve impact vane surface will not be sufficient to materially rotate the valve against the resistance force of the spring action of the thermostat member. However, when more severe conditions are encountered and the piston structure is moved more rapidly and violently, and the impact force of the fluid increases as it endeavors to flow more rapidly through the valve-controlled by-passageway, the valve will be rotated for increasing the fluid flow resistance in proportion to the increasing velocity of the fluid flow. Referring to Figure 2, the fluid forced out of the high pressure chambers flows through the passageways 42 and 42' and the channel 41 of the valve seat member and then through the orifice slit 43 into the valve port and against the vane surface 45 to rotate the valve toward closing position, the arrows indicating the travel of the fluid and the direction of rotation of the valve member, the valve automatically coming to its final compensating setting when the rebound velocity of the fluid is highest.

Figure 3 illustrates the position of the valve member for checking the fluid by-passage when rough road or other abnormal conditions are encountered, it being assumed that the temperature has not changed. Figure 3 also illustrates the automatic thermal setting of the valve by the thermostat element should the temperature in the shock absorber increase during normal ride conditions, the valve having been moved from the position shown in Figure 2 to cover more of the orifice slot 43 so as to restrict the by-passageway of the fluid in accordance with the decreased viscosity of the fluid by the increased temperature. This automatic temperature adjustment of the valve is independent of the adjusting movement of the valve by fluid impact.

Figure 4 shows the valve member for extreme hot temperature, the valve being very close to full closed position, and Figure 5 shows the position of the valve for extreme cold temperature, the valve being almost fully open.

Figure 6 discloses a modified form of valve member, the vane surface 60 being transversely concave. It is conceivable that other shapes of vane surfaces could be used depending upon the impact effect desired.

It will be noted that the orifice 43, although in the form of a comparatively narrow slit, has a large area in proportion to its length so that the flow therethrough is quite turbulent, such turbulence creating resistance to flow and such resistance increasing quite rapidly with increase in fluid velocity. The orifice thus assists the impact operation of the valve to build up the shock absorber resistance as the velocity increases.

A casing 61 is secured to the shock absorber body wall 11 by threading thereon and with the head 15 forms a replenishing chamber 62. Communicating with the lower ends of each of the chambers 26 and 27 is a replenishing passageway 63 controlled by a ball valve 64, the valves closing the passageways during compression of the fluid in the respective chambers. The upper end of each of the chambers 26' and 27' communicates with a restricted passageway 65 which, as shown, is in the form of a slot cut in a plug 66 extending through the head 15. At each plug a well structure 67 is provided whose walls form part of the head 15, the upper ends of the wells being above the passageways 65 and the bottoms of the wells communicating with an annular channel 68 formed in the shaft 20. Any fluid which may leak out between hub and shaft and the shaft bearing will be collected by the channel 68 and the collected fluid will rise in the wells and keep the respective relief channels 65 covered and sealed against the return of fluid to the working chamber at the top thereof. A channel 69 through the shaft connects the channel 68 with the bore or valve chamber 34 so that any fluid which leaks past the valve seat member 36 or the valve member 40 into the valve chamber may escape into the wells 67 and prevent building up of pressure in the valve chamber which might interfere with the operation of the valve mechanism. The fluid which leaks into and circulates through the valve chamber will serve to keep the thermostat element at substantially the same temperature as the fluid in the working chambers and the thermostat element may thus more accurately respond to control the setting of the valve member in accordance with the change of temperature in the working chambers.

The end of the bearing lug 19 may be provided with a conical surface 70 and the outer wall of the casing 61 may be deflected outwardly to form an opposed conical surface 71 suitable packing material 72 being inserted around the shaft between the surfaces which material will be compressed when the casing 61 is secured and will prevent the escape to the exterior of the shock absorber of any fluid which might have been missed by the channel 68.

We have shown practical and efficient embodiments of the various features of our invention but we do not desire to be limited to the exact construction, arrangement and operation shown and described as changes and modifications may be made without departing from the scope of the invention as defined in the appended claims.

We claim as our invention:

1. The combination with an hydraulic shock absorber having a by-passage for the discharge of fluid under pressure, of a regulating valve structure for controlling the discharge of fluid through said by-passage and including an adjustable head at one end, a rotary valve plug at its opposite end, and a stem having universal coupling connections at its ends with said head and said plug respectively.

2. The combination with an hydraulic shock absorber having a by-passage for the discharge of fluid under pressure, of a regulating valve structure for controlling the discharge of fluid through said by-passage and including an adjustable head at one end, a rotary valve plug at its opposite end, and a stem jointed at its ends to said head and plug for rotational movement relative thereto of said head and plug.

3. The combination with an hydraulic shock absorber having a by-passage for the discharge of fluid under pressure, of a regulating valve structure for controlling the discharge of fluid through said by-passage and including an adjustable head at one end, a valve plug at its opposite end, and a stem having ball and socket connections at its ends with said head and plug respectively.

4. The combination with an hydraulic shock absorber having a by-passage for the discharge of fluid under pressure, of a regulating valve structure for controlling the discharge of fluid through said by-passage, said valve structure including a head, a rotary valve plug, a stem jointed at its ends to said head and plug, and a thermostat element connected with said head and plug.

5. The combination with an hydraulic shock absorber having a by-passage for the discharge of fluid under pressure, of a regulating valve structure for controlling the discharge of fluid through said by-passage, said valve structure including a head at one end, a rotary valve plug at the other end, a stem jointed at its ends to said head and plug, and a thermostat element in the form of a helix embracing said stem and secured to said head and plug.

6. The combination with an hydraulic shock absorber having a by-passage for the discharge of fluid under pressure, of a regulating valve structure for controlling the discharge of fluid through said passage, said valve structure comprising a supporting head, a rotary valve, a stem extending between said head and plug and having ball and socket connections with said plug.

7. The combination with an hydraulic shock absorber having a passage for the discharge of fluid under pressure, of a regulating valve structure for controlling the discharge of fluid through said passage, said valve structure including a supporting head, a rotary valve plug, and a stem between said plug and head having universal coupling connection with said head.

8. The combination with an hydraulic shock absorber having a by-passage for the discharge of fluid under pressure, of a regulating valve structure for controlling the discharge of fluid through said by-passage, said valve structure including a supporting head, a rotary valve plug interposed in said by-passageway, a stem between said head and valve plug, said valve plug being jointed to said stem to be held against axial displacement but to be free to rotate, said valve plug having a vane surface against which the fluid flowing through said by-passage may impinge to cause rotary movement of the valve plug and adjustment thereby of said by-passage, and a member yieldingly resisting the rotational movement of said valve plug.

9. The combination with an hydraulic shock absorber having a passage for the discharge of fluid under pressure, of a regulating valve structure for controlling the discharge of fluid through said passage, said valve structure including a rotary valve plug interposed in said by-passage, a supporting head, a stem extending between said head and valve plug, a connection between said stem and valve plug holding said plug against axial displacement but permitting free rotary movement thereof, said valve plug having a port for cooperating with said by-passage to control the flow of fluid therethrough, a thermostat element extending between said head and valve plug for adjusting said plug in accordance with temperature changes, said valve plug port having a vane surface against which the fluid flowing through said passage may impinge to cause rotary movement of said valve and corresponding adjustment of said by-passage for the flow of fluid, said thermostat element functioning as a spring to resist rotary movement of said valve by said fluid.

10. A hydraulic shock absorber comprising a housing for containing resistance fluid, a piston operable within said housing against the resistance flow of said fluid, a fluid by-pass from one side of the piston to the other, a valve seat interposed in said by-passage and having a cylindrical bore, an orifice in the form of a slot extending circumferentially part way around said bore and communicating therewith, a valve plug rotatable in said bore and having a port for cooperating with said orifice, said valve port presenting a vane surface to said orifice against which the fluid under pressure flowing through said orifice may impinge to cause rotary movement of said valve plug for adjustment of said by-passage and yielding means resisting such rotary movement of the valve.

11. A hydraulic shock absorber comprising a housing for containing resistance fluid, a piston operable within said housing against the resistance flow of said fluid, a fluid by-pass from one side of the piston to the other, a valve seat interposed in said by-pass and having a cylindrical bore, an orifice in said seat in the form of a radial slot of comparatively short radial width and extending part way around said bore to communicate therewith and with said by-passage, a valve plug rotatable in said bore and having a longitudinally extending port for cooperating with said orifice to control the flow of fluid through said by-pass, said valve port presenting a vane surface against which the fluid under pressure flowing from said orifice will impinge to cause rotary movement of said valve plug for adjustment of the valve port relative to said orifice for corresponding regulation of the fluid flow through said by-pass, and yielding means resisting such rotational movement of the valve plug.

12. A hydraulic shock absorber comprising a housing for containing resistance fluid, a piston operable within said housing against the flow resistance of said fluid, a by-pass from one side of the piston to the other, a valve seat interposed in said by-pass and having a cylindrical bore, said seat having an orifice for connecting said by-pass with said bore, said orifice being in the form of a comparatively narrow slot extending radially and circumferentially part way around said bore, a cylindrical valve plug rotatable in said bore and having a port for cooperation with the orifice outlet, said valve port presenting a vane surface against which the fluid under pressure flowing through said orifice may impinge to cause rotary movement of said valve and corresponding adjustment of said valve port relative to said orifice for the control of fluid flow through said by-passage, and means yieldingly resisting the rotational movement of said valve, the rotary movement of said valve under fluid impact being in a direction to cause increase in the resistance to fluid flow through said bypassage in proportion to the increasing velocity of the fluid flow through said passage.

13. A hydraulic shock absorber comprising a housing for containing a resistance fluid, a piston operable within said housing against the flow resistance of said fluid, a fluid by-pass from one side of the piston to the other, a valve seat interposed in said by-pass and having a cylindrical bore, an orifice in the form of a narrow circumferentially extending rectangular slot in said valve seat forming part of said by-pass and terminating at said bore, a valve rotatable in said bore and having a port for cooperating with said orifice to control the flow of fluid through said bypass, and thermostat means automatically controlling the rotary movement of said valve.

14. A hydraulic shock absorber comprising a housing for containing a resistance fluid, a piston operable within said housing against the resistance to flow of said fluid, a fluid by-pass from one side of the piston to the other, a valve seat interposed in said by-pass and having a cylindrical bore, an orifice forming part of said by-pass and being in the form of a comparatively narrow rectangular slot extending radially through said valve seat and circumferentially part way around said bore and communicating with said bore, a valve rotatable in said bore and having a port for cooperating with said orifice to control the flow of fluid through said bypass, and thermostat means automatically controlling the rotary movement of said valve.

15. A hydraulic shock absorber comprising a housing for containing a resistance fluid, a piston operable within said housing against the resistance to flow of said fluid, a fluid by-pass from one side of the piston to the other, a valve seat interposed in said by-pass and having a cylindrical bore, an orifice in the form of a narrow circumferentially extending rectangular slot in said valve seat forming part of said by-pass and terminating at said bore, a valve rotatable in said bore and having a port for cooperating with said orifice to control the flow of fluid through said bypass, a manually operable adjusting head, and a thermostat element connected with said head and said valve, said thermostat element serving the dual function of transmitting the adjusting movement of said head to said valve for manual setting thereof and for thereafter automatically controlling said valve in accordance with temperature changes.

16. A hydraulic shock absorber comprising a housing for containing a resistance fluid, a piston operable within said housing against the resistance to flow of said fluid, a fluid by-pass from one side of the piston to the other, a valve seat interposed in said by-pass and having a cylindrical bore, an orifice in said seat in the form of a narrow circumferentially extending slot forming part of said by-pass and terminating at said bore, a valve having a port and being rotatable in said bore for cooperation of said port with said orifice, said port adapted during rotation of said valve to circumferentially overlap more or less of said orifice to thereby control the flow of fluid through said by-pass, and thermostat means automatically controlling the movement of said valve.

17. A hydraulic shock absorber comprising a housing for containing resistance fluid and providing high and low pressure chambers, a piston operable in said housing against the resistance to flow of said fluid, a by-pass for the flow of fluid from the high pressure chamber to the low pressure chamber as said piston moves, a valve seat having a bore and an orifice forming part of said by-pass and communicating with said bore to conduct the fluid thereto from said high pressure chamber, said orifice being in the form of a comparatively narrow and radially shallow slit extending a distance circumferentially around said bore, a valve having a port and being movable in said bore for cooperation of said port with said orifice to circumferentially overlap said orifice more or less for corresponding exposure to the fluid flow, and means for adjusting said valve.

18. A hydraulic shock absorber comprising a housing for containing resistance fluid and providing high and low pressure chambers, a piston operable in said housing against the resistance to flow of said fluid, a by-pass for the flow of fluid from the high pressure chamber to the low pressure chamber as said piston moves, a valve seat having a bore and an orifice forming part of said by-pass and communicating with said bore to conduct the fluid thereto from said high pressure chamber, said orifice being in the form of a comparatively narrow and radially shallow slit extending a distance circumferentially around said bore, a valve having a port and being movable in said bore for cooperation of said port with said orifice to circumferentially overlap said orifice more or less for corresponding exposure thereof to the fluid flow, and thermostat means for automatically adjusting the valve in accordance with temperature changes.

19. A unitary valve structure for hydraulic shock absorbers comprising a valve, a supporting head, a stem having universal coupling connection at its ends with said valve and head, and a thermostat coil surrounding said stem and secured at its ends to said valve and head respectively.

20. A unitary valve structure for hydraulic shock absorbers comprising a valve, a supporting head, a stem having universal coupling connection at its ends with said valve and head for preventing relative axial movement but permitting relative rotary movement of said valve and head, and a thermostat element in the form of a helix surrounding said stem and secured at its ends to said valve and head respectively for automatically controlling the rotational movement of said valve when said head is held stationary.

21. The combination with a hydraulic shock absorber having a by-passage for the discharge of fluid under pressure, of a regulating valve structure for controlling the discharge of fluid through said by-passage and including a head at one end, a valve at its opposite end, and a stem structure having universal coupling connection with said head.

22. The combination with a hydraulic shock absorber having a by-passage for the discharge of fluid under pressure, of a regulating valve structure for controlling the discharge of fluid through said by-passage and including a head at one end, a valve at its opposite end, and a stem structure having ball and socket connections with said head.

23. The combination with a hydraulic shock absorber having a by-passage for the discharge of fluid under pressure, of a regulating valve structure for controlling the discharge of fluid through said by-passage and including a head at one end, a valve at its opposite end, a stem structure extending from the valve and having universal coupling connection at its end with said head, and a thermostat element adapted to move said valve for control of the fluid flow through said by-passage in accordance with the temperature changes of said fluid.

24. A unitary valve structure for hydraulic shock absorbers comprising a valve, a supporting head, a stem structure between said valve and head having universal coupling connection with said head, and a thermostat element connected to move said valve relative to said head in accordance with temperature changes.

25. The combination with a hydraulic shock absorber having a by-passage for the discharge of fluid under pressure, of a unitary valve structure for controlling the discharge of fluid through said by-passage and including a supporting head at one end, a rotary valve at its opposite end, universal coupling connection between said head and valve, and a thermostat element connected to rotate said valve relative to said head in accordance with temperature changes.

26. The combination with a hydraulic shock absorber having a by-passage for the discharge of fluid under pressure, of a unitary valve structure for controlling the discharge of fluid through said by-passage and including a supporting head at one end, a valve at its opposite end, universal coupling connection between said head and valve, and a thermostat element connected to move said valve relative to said head in accordance with temperature changes, said head and said valve and said thermostat element being co-axial.

27. In a thermostatically controlled valve for a vehicle shock absorber, an outer valve member provided with an elongated circumferentially extending slot therethrough, an inner valve member rotatable relative to said outer valve member and provided with a flat portion underlying said slot, and a thermostat interacting between said members to rotate said inner member relative to said outer member for varying the extent of circumferential overlap of said slot by said flat portion whereby the area of the opening of said slot will increase or decrease in direct proportion to the rate of increase or decrease of the temperature of the shock absorber liquid throughout the entire operative temperature range of said shock absorber.

28. In a thermostatically controlled valve for a vehicle shock absorber, an outer valve member provided with an elongated circumferentially extending slot therethrough, an inner valve member rotatable relative to said outer valve member and provided with a flat portion underlying said slot, and a thermostat interacting between said members to rotate said inner member relative to said outer member for varying the circumferential extent of exposure of said slot to said flat portion whereby to regulate the hydraulic fluid flow in accordance with changes in the temperature of the fluid throughout the entire operative temperature range of said shock absorber.

29. A hydraulic shock absorber comprising a housing for containing a resistance fluid, a piston operable within said housing against the flow resistance of said fluid, a fluid by-pass from one side of the piston to the other, a valve seat interposed in said by-pass and having a cylindrical bore, an orifice in the form of a narrow circumferentially extending slot in said valve seat forming part of said by-pass and terminating at said bore, a valve rotatable in said bore and having a port for communicating with said orifice to control the flow of fluid through said by-pass, said port being of a width to entirely circumferentially span said orifice or to overlap the same more or less during rotation of said valve, and thermostat means automatically controlling the rotary movement of said valve.

30. In a valve structure for a hydraulic shock absorber, an outer valve member provided with an elongated circumferentially extending slot therethrough, an inner valve member rotatable relative to said outer member and provided with a flat portion underlying said slot, said flat portion constituting a vane surface against which the hydraulic liquid may impinge to cause rotary movement of said inner valve member to adjust the area of opening through said slot in accordance with the pressure exerted against said surface.

31. In a valve structure for a hydraulic shock absorber, an outer valve member provided with an elongated circumferentially extending slot therethrough, an inner valve member rotatable relative to said outer valve member and provided with a flat portion underlying said slot, said flat portion constituting a vane surface against which the hydraulic fluid may impinge to cause rotary movement of the inner valve member to decrease the area of opening through said slot in accordance with the pressure exerted against said surface.

MERRITT L. FOX.
FRED E. ULLERY.